United States Patent
Andrews et al.

(10) Patent No.: US 6,581,947 B2
(45) Date of Patent: Jun. 24, 2003

(54) STEERAGE OF A VEHICLE

(76) Inventors: Stuart John Andrews, 7 Bendigo Street, Fisher ACT 2611 (AU); Wayne John Kotzur, 12 Harp Street, Gundaroo NSW 2620 (AU)

( * ) Notice: Subject to any disclaimer, the term of this patent is extended or adjusted under 35 U.S.C. 154(b) by 0 days.

(21) Appl. No.: 09/860,729

(22) Filed: May 18, 2001

(65) Prior Publication Data

US 2001/0042968 A1 Nov. 22, 2001

(30) Foreign Application Priority Data

May 19, 2000 (AU) .............................. PQ7642

(51) Int. Cl.⁷ ............................................ B62K 5/08
(52) U.S. Cl. .................... 280/266; 280/235; 280/242.1; 280/249
(58) Field of Search ............... 280/220, 242.1, 280/249, 250, 250.1, 266, 282, 235

(56) References Cited

U.S. PATENT DOCUMENTS

| | | | |
|---|---|---|---|
| 223,691 A | * 1/1880 | Allen ........................ 280/266 |
| 430,107 A | * 6/1890 | Brock ....................... 280/266 |
| 2,578,828 A | * 12/1951 | Nelson ...................... 280/266 |
| 3,690,697 A | * 9/1972 | Bohanski .................... 280/247 |
| 4,460,190 A | * 7/1984 | Spiess ...................... 280/247 |
| 4,700,962 A | * 10/1987 | Salmon ...................... 280/220 |
| 4,968,274 A | * 11/1990 | Gregory ................. 144/114 A |
| 5,022,671 A | * 6/1991 | Jones, Jr. ................... 280/250 |
| 5,028,064 A | 7/1991 | Johnson |
| 5,354,084 A | * 10/1994 | Lofgren et al. ............. 280/250 |
| 5,374,206 A | * 12/1994 | Gregory ..................... 440/27 |
| 5,568,935 A | * 10/1996 | Mason ....................... 280/282 |
| 5,853,184 A | * 12/1998 | Lofgren et al. .......... 280/242.1 |
| 6,070,894 A | * 6/2000 | Augspurger ................ 280/249 |
| 6,105,986 A | * 8/2000 | Franks et al. .............. 280/250 |
| 6,352,274 B1 | * 3/2002 | Redman ..................... 280/248 |
| 6,402,174 B1 | * 6/2002 | Maurer ...................... 280/266 |

FOREIGN PATENT DOCUMENTS

FR 2657318 A * 7/1991 ............ B62D/6/00

* cited by examiner

Primary Examiner—Lesley D. Morris
Assistant Examiner—Daniel Yeagley
(74) Attorney, Agent, or Firm—Leydig, Voit & Mayer, Ltd.

(57) ABSTRACT

A hand cycle includes a frame and a seat which is pivotable relative to the frame about a longitudinally extending axis to effect steerage of the hand cycle.

7 Claims, 2 Drawing Sheets

Section 'A-A'

STEERAGE OF A VEHICLE

FIELD OF INVENTION

The present invention relates to the steerage of vehicles. The invention has particular, but not exclusive, utility with human-powered vehicles such as hand cycles and recumbent cycles. The invention will hereinafter be described with reference to a hand cycle for illustrative purposes only.

BACKGROUND ART

It is well known for disabled athletes to participate in wheelchair-based sports. More recently, hand cycles have become popular and are now recognised as a separate category of competition.

A hand cycle is a multi-wheeled human-powered vehicle which has a pair of cranks which are "pedalled" with the athlete's hands and arms. Typically, the cranks are in phase, as compared to conventional foot-pedalled cranks which are typically out of phase.

Steerage of a hand cycle presents some difficulties due to the fact that the athlete's hands are otherwise occupied in cranking the vehicle. In one known solution, it is known to apply differential braking to the left or right wheels via brake levers disposed on the hand cranks whereby "brake-steering" of the vehicle is achieved. In other known solutions, the athlete must release the cranks in order to manipulate a steering device. In any case, it is usually necessary to cease cranking in order to effect steering.

In other types of vehicles such as recumbent bicycles, it is likewise necessary to steer the vehicle via some mechanism manipulated by the cyclist's hands.

SUMMARY OF INVENTION

According to one aspect the invention resides in a vehicle including: a frame; and a seat pivotally mounted with respect to the frame for pivoting about a seat pivot axis which extends substantially longitudinally of the vehicle, wherein pivoting of the seat relative to the frame about the seat pivot axis effects steerage of the vehicle.

According to a second aspect the invention resides in a hand cycle including: a frame; and a seat pivotally mounted with respect to the frame for pivoting about a seat pivot axis which extends substantially longitudinally of the hand cycle, wherein pivoting of the seat relative to the frame about the seat pivot axis effects steerage of the hand cycle.

The invention will now be described with reference to a hand cycle for illustrative purposes only.

DETAILED DESCRIPTION OF THE INVENTION

Figure 1:
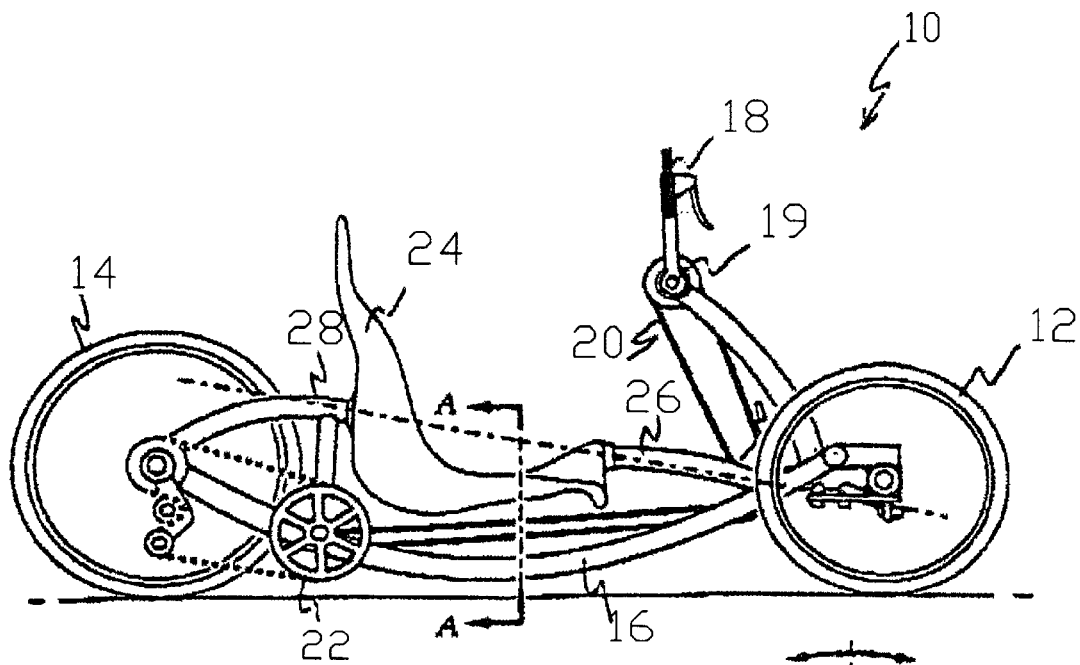
FIG. 1 is a side elevation of a hand cycle according to the present invention.

Referring now to FIG. 1, there is shown a hand cycle 10 having a pair of front wheels 12 and a single rear wheel 14 mounted for rotation in the usual manner relative to a tubular frame 16. In alternative embodiments, the vehicle could have 2 wheels (eg. recumbent bicycle) or 4 wheels.

Hand cranks 18 are pivotally mounted to a bracket located at a forward point of the frame 16 for rotation about a transverse drive axis 19. As an aside, and with reference to FIG. 2, it will be noted that the cranks 18 are in phase, in contrast to conventional bicycles where the cranks are out of phase.

Hand cranks 18 are manually driven by the user to thereby drive rear wheel 14. This occurs via belt 20 which drives chain-ring 22, which in turn drives rear wheel 14 via a conventional bicycle derailleur gearing system. However, drive can be transferred from the cranks to the front or rear wheels in any known manner and the drive system is not pertinent to the-present invention. Likewise, the braking system is not pertinent to the present invention and is accordingly not described here.

It will be noted that in side elevation, as shown in FIG. 1, the frame includes upper and lower longitudinally extending frame members. The frame also includes a pair of transversely extending struts at the front of the hand cycle for mounting the front wheels 12 and the frame also includes an upwardly extending post at the front of the hand cycle for mounting the cranks 18 in an appropriate bracket for rotation about transverse drive axis 19.

Seat 24, which in the preferred embodiment is constructed of carbon fiber but could be made of other materials, is interposed in the upper frame member and is thus integral with, and rotatable relative to, the upper frame member. It will be noted that the upper frame member extends forwardly away from the front of the seat 24 via a forwardly extending frame member 26, and rearwardly away from the rear of the seat 24 via a rearwardly extending frame member 28.

Seat 24 is thus located and mounted for pivotable rotation about a substantially longitudinally extending, and forwardly declined, seat pivot axis which extends between the forwardly extending frame member 26 and rearwardly extending frame member 28 (see the dotted line in FIG. 1). Notably, the seat pivot axis (dotted line in FIG) lies in a longitudinal plane which is orthogonal to the transverse drive axis 19.

The seat pivot axis passes through pivot point 34 of the seat backrest as shown. The seat pivot axis desirably passes close to the center of gravity of an athlete seated in seat 24. As an aside, it is pointed out that the center of gravity of a disabled athlete tends to be relatively high, as their upper bodies tend to be highly developed, whilst their lower bodies are typically less developed.

In the illustrated embodiment, the athlete's center of gravity is slightly above the pivot point 34 and hence the athlete and seat 24 would tend to topple about the pivot point 34 if it weren't for the athlete holding themselves centrally in place via the application of a continuous tangential (with respect to the seat pivot axis) force applied to the frame via the hand cranks 18. The tangential (with respect to the seat pivot axis) force required to hold the athlete in place is relatively small because the center of gravity is only slightly above the pivot point 34 and accordingly the lever arm of the center of gravity about the pivot point 34 is small.

Alternatively, if the center of gravity were slightly below the seat pivot axis, the seat would tend to self-center under gravity which may also be a desirable arrangement in some circumstances. In this case, a continuous force would be required to urge the seat away from the central or neutral steering position.

Figure 2:
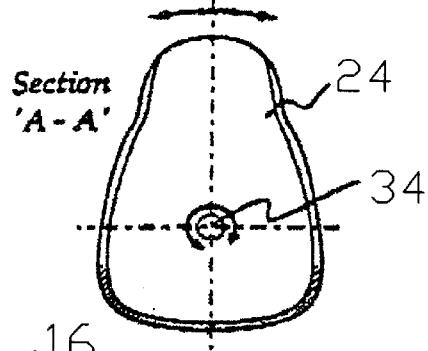
FIG. 2 is a frontal perspective view of the hand cycle of FIG. 1.
Figure 2:
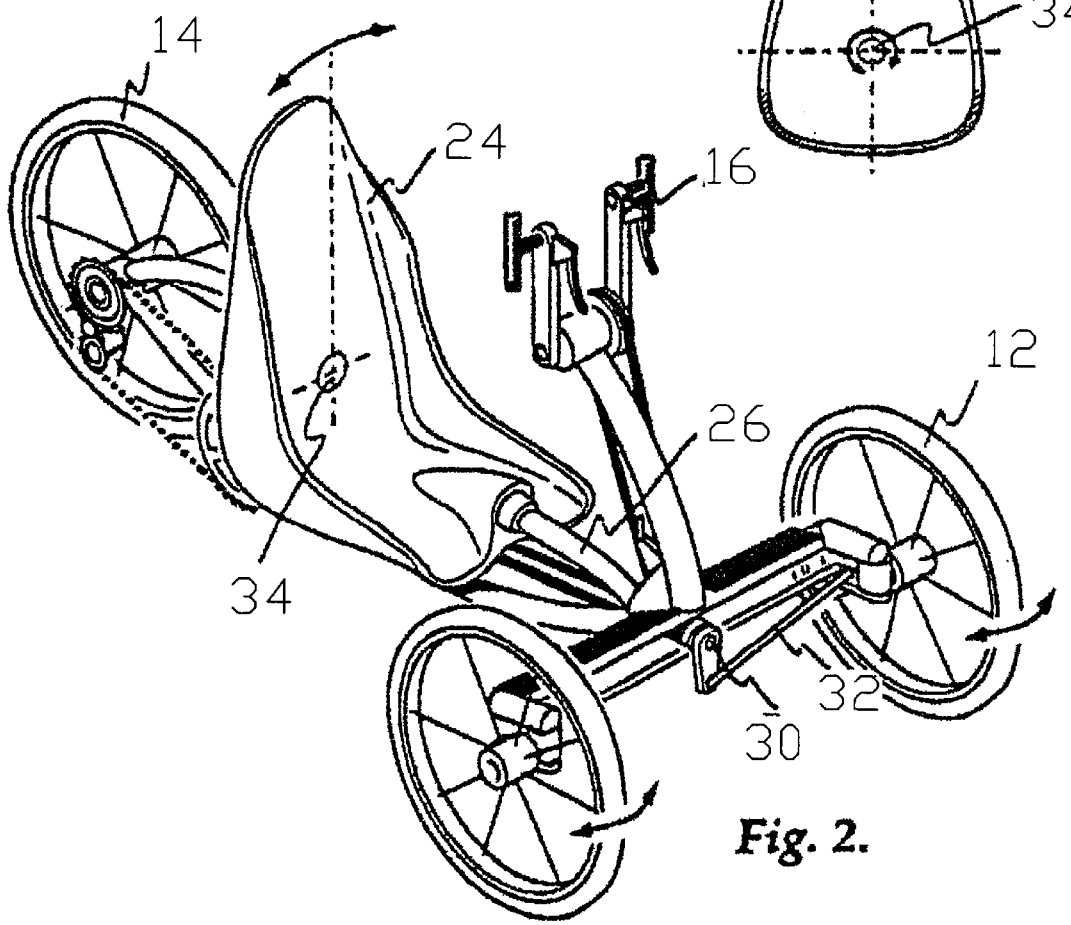

With reference now to FIG. 2, it will be noted that a steering shaft 30 extends forwardly from the seat 24, internally through the forwardly extending frame member 26, and emerges centrally between the front wheels 12 as shown. Steering shaft 30 steers the front wheels 12 via a conventional steerage linkage 32.

Figure 3:
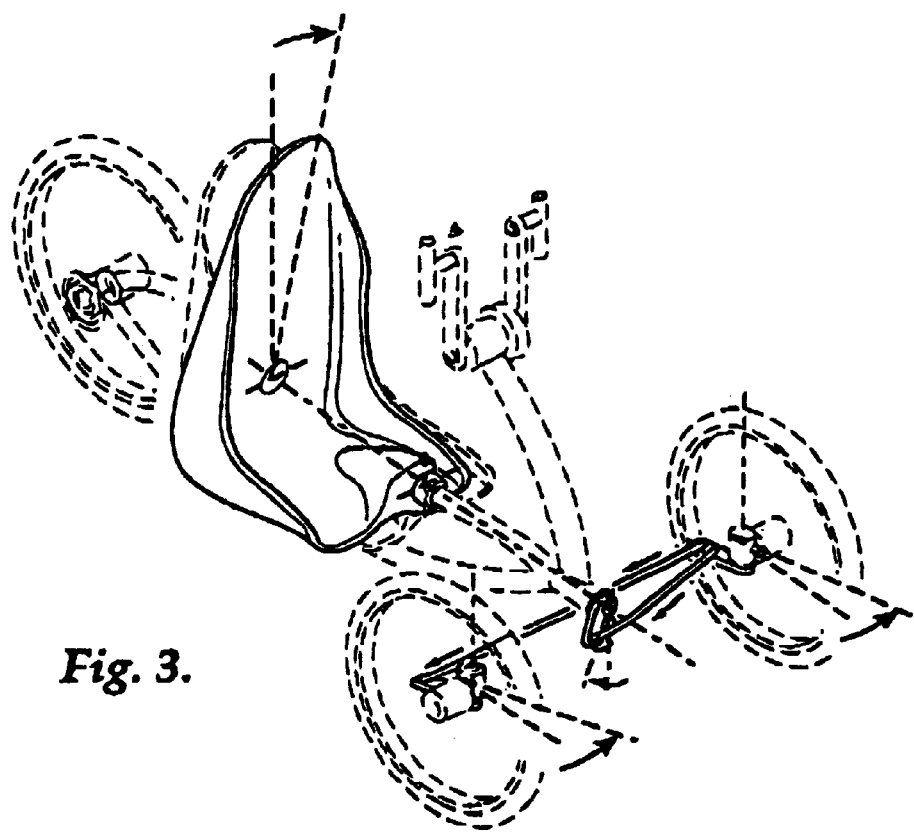
FIGS. 3 and 4 are schematic frontal perspective views of the hand cycle of FIG. 1 illustrating steerage of the hand cycle.
Figure 4:
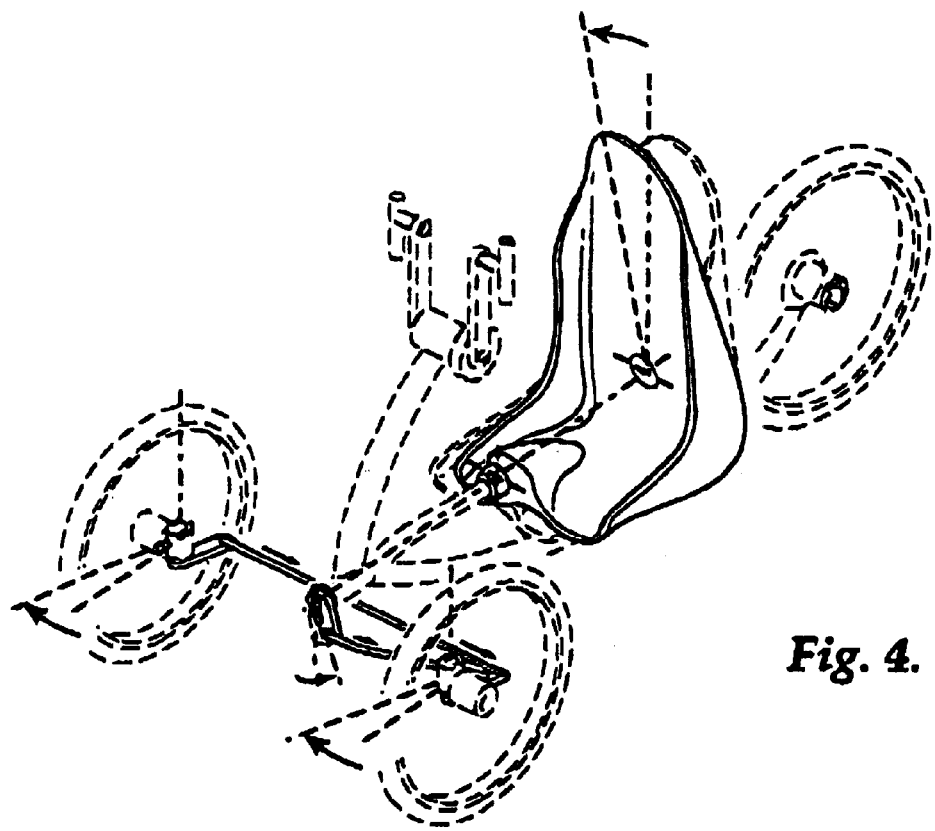

It will thus be understood that pivoting of the seat 24 relative to the frame about the longitudinally extending seat pivot axis (dotted line in FIG. 1) effects steerage of the front wheels via the steering shaft 30 which extends internally through the forwardly extending frame member 26. This will be best understood with reference to FIGS. 3 and 4 which schematically show left and right steerage, respectively.

In the preferred embodiment, a steering damper (not illustrated) is provided such that pivoting of the seat relative to the frame, and hence steerage, is damped. Desirably, the damper is a variable rate damper which can be selectively adjusted by the athlete. At high speed, the steerage would desirably be highly damped for stability, whereas at low speed steerage would be less damped to allow a tighter turning circle.

In summary, the present invention provides a steering system in which the user's hands can attend to other tasks during steerage. In the case of a hand cycle, this other task is the cranking of the vehicle and the concurrent generation of tangential forces about the seat pivot axis to control steerage via the tilting of the seat. In the case of a recumbent cycle, the user may hold onto the frame and manipulate braking and gearing, for example.

The present invention has numerous advantages over the prior art. Firstly, steerage is effected through the seat which is controlled by applying continuous tangentially directed forces to the frame. In the case of the hand cycle, this is achieved by applying continuous tangentially directed forces against the cranks 18. Thus, if the athlete wishes to steer left, they direct a rightwardly directed force against the cranks 18 thereby generating a reactive tangential force which tilts the seat 24 to the left and turns the front steering wheels 12 to the left (see FIG. 3). To terminate the left turn, they may apply a leftwardly directed force to the cranks to thereby "pull" themselves back to the upright central or steering-neutral position. Of course, if the center of gravity were below the seat pivot axis, they would tend to return to the neutral position by default under the effect of gravity.

Another advantage of the present invention is that the athlete can continue to crank the hand cranks 18 whilst cornering. In this regard, the tangential force can be applied to the cranks 18 by the athlete without interrupting the cranking action by virtue of the fact that the seat pivot axis lies in a plane which is orthogonal to the cranking drive axis 19. This is a distinct advantage over previously known systems which required a discontinuation of cranking during steering.

A further advantage is that the transfer of body weight, which occurs concurrently with the tilting of the seat to effect steerage, has the added benefit of moving the athlete's weight towards the center of the turn, thereby resisting the tendency of the vehicle to roll outwardly under the effect of centrifugal force.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A hand cycle including:
   a frame, including a forward frame member housing a steering shaft;
   a steering mechanism; and
   a seat supported by said forward frame member, and pivotally mounted with respect to the frame for pivoting about a seat pivot axis which extends substantially longitudinally of the hand cycle, said steering shaft operatively connecting the seat to the steering mechanism whereby pivoting of the seat relative to the frame about the seat pivot axis effects steerage of the hand cycle.

2. The hand cycle as claimed in claim 1 wherein the frame includes at least one driven wheel mounted relative to the frame for rotation about a first transverse axis; and at least a pair of hand cranks pivotably mounted relative to the frame for rotation about a second transverse axis, the second transverse axis being spaced from the first transverse axis.

3. The hand cycle as claimed in claim 1, wherein the seat includes a backrest and is pivotally suspended between a forward pivot point and a rearward pivot point, a line between the forward pivot point and rearward pivot point defining the seat pivot axis which passes through the backrest of the seat.

4. The hand cycle as claimed in claim 1, wherein the seat pivot axis is declined from the rear to front of the hand cycle.

5. The hand cycle as claimed in claim 1, for transporting a cyclist, the cyclist having a center of gravity, wherein the center of gravity is above the seat pivot axis.

6. The hand cycle as claimed in claim 1, for transporting a cyclist, the cyclist having a center of gravity, wherein the center of gravity is below the seat pivot axis.

7. The hand cycle as claimed in claim 1, wherein the hand cycle includes hand cranks, and wherein the cyclist can apply laterally directed forces to said cranks to thereby pivot the seat about the seat pivot axis and thereby effect steerage.

* * * * *